United States Patent [19]
Aimi et al.

[11] 3,819,275
[45] June 25, 1974

[54] TRANSLATOR FOR MEASURING AMOUNT OF COLOR CORRECTION FOR COLOR

[75] Inventors: Mitsuo Aimi; Kiyoshi Seigenji, both of Sakai, Japan

[73] Assignee: Minolta Camera Kabushiki Kaisha, Higashiku, Osaka, Japan

[22] Filed: Feb. 26, 1973

[21] Appl. No.: 337,232

[30] Foreign Application Priority Data
Feb. 29, 1972 Japan..........................47-20774

[52] U.S. Cl.................. 356/175, 355/38, 356/178
[51] Int. Cl.............................................. G01j 3/50
[58] Field of Search......... 355/35, 38; 356/175, 178

[56] References Cited
UNITED STATES PATENTS

| | | | |
|---|---|---|---|
| 3,527,540 | 9/1970 | Bowker et al...................... | 356/175 |
| 3,612,683 | 10/1971 | Riley et al.......................... | 356/175 |
| 3,697,174 | 10/1972 | McCune.............................. | 355/38 |

*Primary Examiner*—Ronald L. Wibert
*Assistant Examiner*—F. L. Evans
*Attorney, Agent, or Firm*—Wolder & Gross

[57] ABSTRACT

A translator comprising a light receiving unit including three kinds of photocells having spectral sensitivities to red, green and blue colors respectively for receiving light from the optical projecting system of an enlarger equipped with color correction filters, arithmetic units for calculating ratios between the outputs of the photocells by taking one of the outputs as denomenators and the other two outputs as numerators respectively, comparison output setting units having their outputs determined only by the conditions of a negative previously memorized for comparison with the outputs from the arithmetic units respectively, and comparison units for comparing the outputs from the arithmetic units with the corresponding comparison outputs individually to indicate the differences therebetween, whereby the amount of color correction given only by the conditions of the negative is adjusted for the enlarger actually used for color printing.

9 Claims, 4 Drawing Figures

TRANSLATOR FOR MEASURING AMOUNT OF COLOR CORRECTION FOR COLOR

BACKGROUND OF THE INVENTION

This invention relates to a translator for measuring the amount of color correction for color printing, more particularly to a translator for correcting the spectral characteristics of projected light on the easel of a photographic enlarger for color printing, based on the amounts of color correction and exposure as determined for example by a negative color analyzer which measures these amounts only from the conditions of the negative, as well as on other additional conditions of which will virtually affect color prints such as those involved in the optical projecting system of the enlarger, color balance correction filter, etc.

In making color prints on an enlarger equipped with color balance correction filters, it has heretofore been practiced to select a combination of correction filters for a particular color negative such that the ratio of measured light intensities for the red, green and blue colors will be identical with the tricolor light intensity ratio previously determined by experiments and to determine the exposure time by measuring the intensity of light passing through the color negative with the selected filters set in position.

However, this method has to be practiced in the darkroom and the operations involved are very troublesome and inefficient inasmuch as changing one of the red, green and blue filters affects the outputs of the other two filters.

As disclosed in United States Patent application, Ser. No. 135247 filed Apr. 19, 1971, we have already proposed an apparatus of the non-darkroom type for measuring the amount of color correction for color printing, namely a negative color analyzer. by which the light intensity measurement is conducted for the color negatives to automatically determine the amount of color correction and exposure time in an attempt to improve the above-mentioned complex and troublesome procedure which requires much experience. In fact, the proposed apparatus indicates the desired color correction filters and exposure time instantaneously and simultaneously.

However, since the negative color analyzer measures the amount of color correction and exposure time based only on the conditions of the negative, the information thereby provided does not include none of the changes in the conditions of the optical projecting system of the enlarger such as age of the light source, variations in the power source voltage, fading of the color correction filters, fluctuations in the transmission factors of the filters per se and difference in the amount of color correction attributable to the spectral transmission factor of the enlarger lens which differs from enlarger to enlarger. Consequently, if printing is conducted on the enlarger based on the foregoing information, the changes in the conditions of the projecting optical system and the like will adversely affect the quality of the image on the resulting color print.

Furthermore, its has been desired that the negative color analyzer be adapted for use with enlargers of both color additive type and color subtractive type and that, for use with enlargers of the subtractive type, a negative color analyzer adapted for correction with filters of a certain series, for example of Kodak series, be also adapted for used with an enlarger equipped with color correction filters of Agfa series.

SUMMARY OF THE INVENTION

An object of this invention is to provide an apparatus for properly correcting the spectral characteristics on the easel of an enlarger based on the amounts of color correction and exposure as determined only from the conditions of a negative by the aforementioned negative color analyzer or by some other means so as to determine the printing conditions which will eventually assure a color print of the intended quality, the correction being achieved by the apparatus by taking into account the effect of other varying conditions involved in the optical projecting system of the enlarger used.

Another object of this invention is to provide an apparatus for determining the above-mentioned amounts of projected light and exposure simply and promptly without requiring hardly any skill.

Still another object of this invention is to provide a translator serving as an attachment for the determination of the amounts of color correction and exposure so as to render the aforementioned negative color analyzer usable for enlargers of different types, whether color additive type or color subtractive type, so that for use with enlargers of the subtractive type the analyzer will be applicable to an enlarger having color correction filters of a series other than the particular series of filters for which the analyzer is adjusted for use, the translator thus making the analyzer applicable to a much wider variety of uses.

According to this invention, the red, green and blue light outputs on the easel of enlarger are measured for example by light measuring means in terms of B/R, G/R and R, B being an output of blue light, R being that of red light and G being that of green light.

With respect to color balance, therefore, it is sufficient to detect the two outputs of B/R and G/R, and the amount of exposure can be expressed by the output R.

According to this invention, only two outputs, for example, of B/R and G/R, are set to a standard at the same time, with the remaining output R serving to eventually vary the diaphragm aperture value to determine the amount of exposure. Thus the procedure requires hardly any labor and skill.

Further according to the present invention, the spectral characteristics of projected light are corrected on the easel, with the result that the exposure time, when maintained at a constant value, will render the color balance free of error due to reciprocity failure.

Other objects and features of this invention will become more apparent from the description of an embodiment given below.

DESCRIPTION OF THE PREFERRED EMBODIMENT

Figure 1:
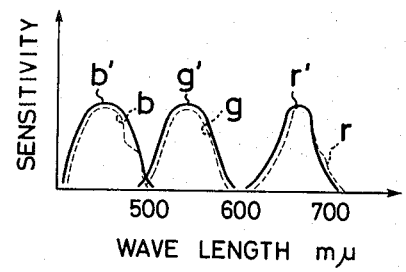
FIG. 1 is a diagram showing the spectral sensitivities of printing paper in comparison with the sensitivity characteristics of photocells included in a light receiving unit of translator of this invention.

With reference to FIG. 1, the spectral sensitivities of color printing paper are indicated in broken lines r, g and b for red, green and blue colors with the decrease in the wave length of light.

Figure 2:
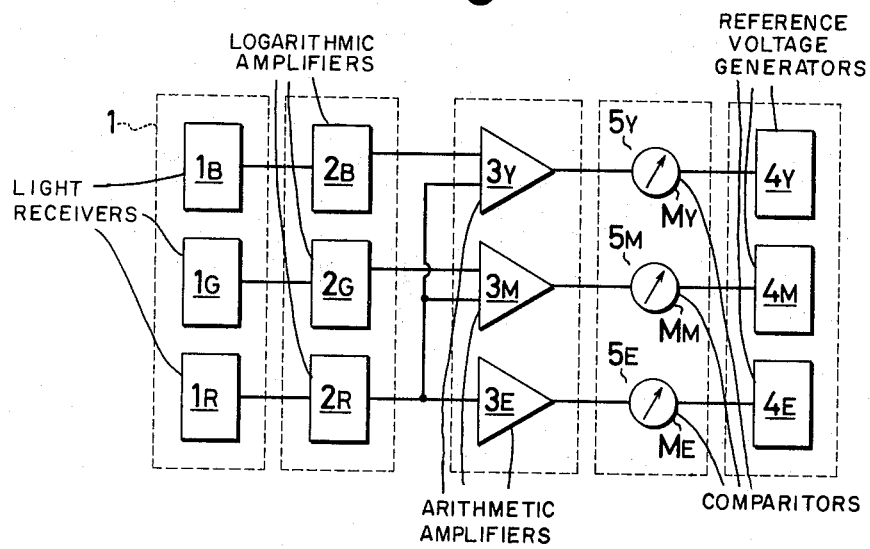
FIG. 2 is a diagram showing the measuring system of an embodiment of this invention.

Designated at 1 in FIG. 2 is a light receiving unit according to this invention which includes photocells 1R, 1G and 1B having spectral sensitivities to red, green and blue respectively. As indicated in solid lines in FIG. 1, the photocells 1R, 1G and 1B have sensitivity characteristics r', g' and b' in approximation to the spectral sensitivities r, g and b of the printing paper for red, green and blue ranges shown in FIG. 1 respectively. When the unit 1 is placed on the easel of an enlarger for color printing, color correction filters produce changes in the outputs of the respective photocells 1R, 1G and 1B in equivalent relation to the effects produced by the filters on the printing paper.

The outputs of the photocells 1R, 1G and 1B are converted to logarithmic form by logarithmic converter circuits 2R, 2G and 2B. Since the color densities vary logarithmically, to treat the outputs in terms of logarithm assures a greater convenience in operation than to treat the same anti-logarithmically.

Indicated at 3Y, 3M and 3E are arithmetic amplifier circuits, among which 3M calculates the difference between the outputs from the photocell 1R responsive to red light and the photocell 1G responsive to green light after the outputs have been logarithmically converted by the logarithmic converter circuits 2R and 2G respectively. Likewise, the circuit 3Y calculates the difference between the outputs from the photocell 1R and the photocell 1B responsive to blue light after the outputs have been logarithmically converted by the circuits 2R and 2B.

Assuming that the outputs produced by the photocells 1R, 1G and 1B in response to red, green and blue light are R, G and B respectively, the amplifier circuit 3M calculates $\log G - \log R$ and the amplifier circuit 3Y, $\log B - \log R$. These two sets of ratios involve the outputs responsive to red, green and blue light. Thus the two ratios when given determine color balance only by comparing them with reference voltages or currents corresponding to the color densities of the negative (for example, yellow density and magenta density).

The arithmetic amplifier circuits 3E is a circuit for amplifying the output from the photocell 1R which has been converted to logarithmic form by the converter circuit 2R. The aforementioned amount of exposure is determined by the output of the circuit 3E.

Circuits 4Y, 4M and 4E generate reference voltages (or currents) to be compared with the outputs from the arithmetic amplifier circuits 3Y, 3M and 3E. The comparison between the outputs from the circuits and those from the arithmetic amplifier circuits is performed by comparison circuits 5Y, 5M and 5E comprising differential amplifier circuits including meters MY, MM and ME respectively.

Figure 3:
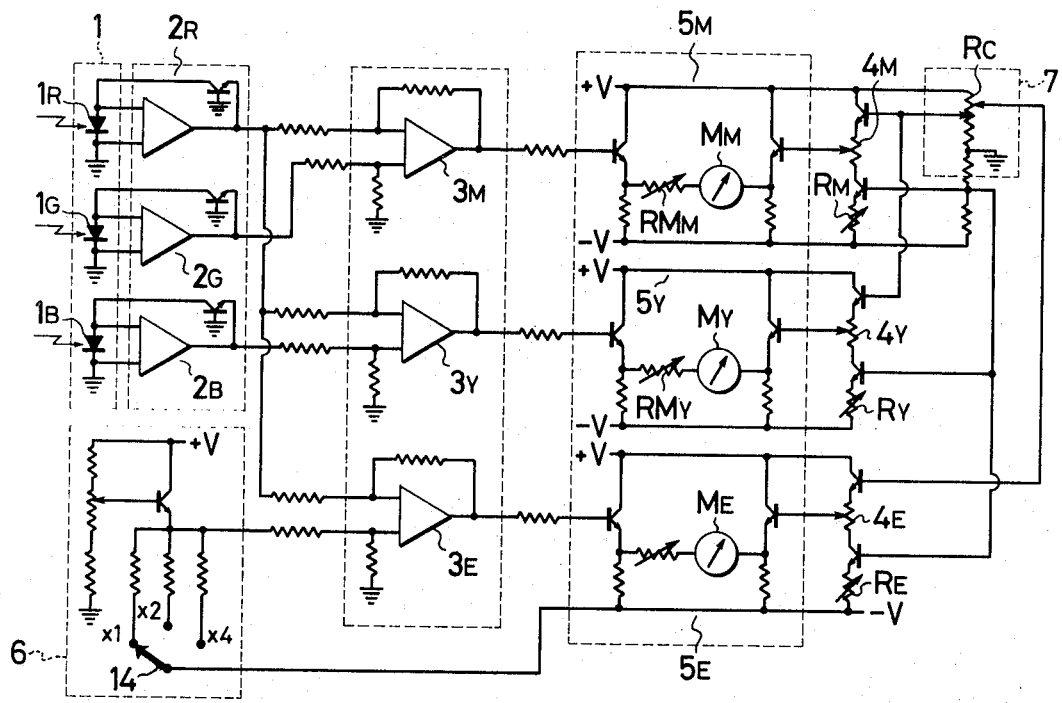
FIG. 3 is a diagram showing an exemplary electric circuit of the embodiment of this invention.

As illustrated in FIG. 3, the reference voltage generating circuit 4Y includes a potentiometer RY for setting the comparison reference voltage (or current) for the yellow color density of the negative at a level equivalent to a value for yellow color correction informed for example by a negative color analyzer or by some other means or at a level equivalent to a value for yellow color correction informed by some other means and determined only from the conditions of the negative. The reference voltage generating circuit 4M includes a potentiometer RM for setting the comparison reference voltage (or current) for the magenta color density of the negative at a level equivalent to a value for magenta color correction informed by means similar to the above.

The comparison circuits 5Y and 5M indicate on the meters MY and MM the differences between the outputs of the arithmetic amplifier circuits 3Y, 3M and the outputs of the corresponding reference voltage generating circuits 4Y, 4M. The readings on the meters MY and MM are zero if the outputs of the circuits 3Y and 4Y are equal and those of 3M and 4M are equal respectively, this indicating that the printing conditions sensed by the light receiving unit involving the color densities of the negative measured beforehand by a color analyzer or the like and the optical projecting system of the enlarger including the color correction filters in combination therewith are suitable to give a print of the desired image quality.

As shown in FIG. 3, the reference voltage generating circuit 4E includes a potentiometer RE for setting the amount of exposure.

The comparison circuit 5E compares the output of the arithmetic amplifier circuit 3E with the output of the reference voltage generating circuit 4E to indicate the difference on the meter ME.

To avoid insufficiency of output of the photocell 1R even when the lens aperture of the enlarger is fully opened up, as would be encountered in making a color print at a high magnification, the arithmetic amplifier circuit 3E includes an exposure multification number setting circuit 6 by which a reference output is set for comparison with the output R of the photocell 1R, such that if the output R is insufficient the reference output will be reduced to increase the difference therebetween. The circuit 6 is adapted for output setting at levels one time (x1), two times (x2) and four times (x4) the output R of the photocell 1R. When it is set at two times, the exposure time must be so adjusted as to increase to a value twofold the reading on the meter ME of the comparison circuit 5E and at four times setting, fourfold the reading.

The meter M shows the difference between the outputs of the arithmetic amplifier circuit 3E and the reference voltage generating circuit 4E.

In enlarging a negative which is extremely out of color balance, namely which has a low cyan cast, there arises a need to use a cyan filter in addition to yellow and magenta filters. If measurement is conducted in this case, the meter will come to balance at a position where the comparison voltage is low. If yellow and magenta filter numbers are indicated in operative relation to the potentiometer for the control of the comparison voltage, a negative filter number may possibly be indicated. Since the circuits are constructed to give the spectral outputs in terms of G/R and B/R ratios, the indications given will be: −15 for Y (yellow color correction filter), 10 for M (magenta color correction filter) and 0 and C (cyan color correction filter) even if the respective color correction filters are: Y: 5, M: 30 and C: 20. However, actually there is no filter with a negative number, hence the necessity to reduce the overall voltage level to turn the voltage positive at the pertinent position on the potentiometer.

For this operation, there is provided a circuit 7 for parallelly translating the comparison reference voltage (or current) to reduce the overall voltage by an amount corresponding to B/R or C/R when the cyan color correction filter is used. The parallel translation circuit 7 in the illustrated embodiment is operated by a variable resistor RC, which may alternatively be replaced by a group of fixed resistors having varying resistivities to give a stepwisely variable resistivity by changing over.

Figure 4:
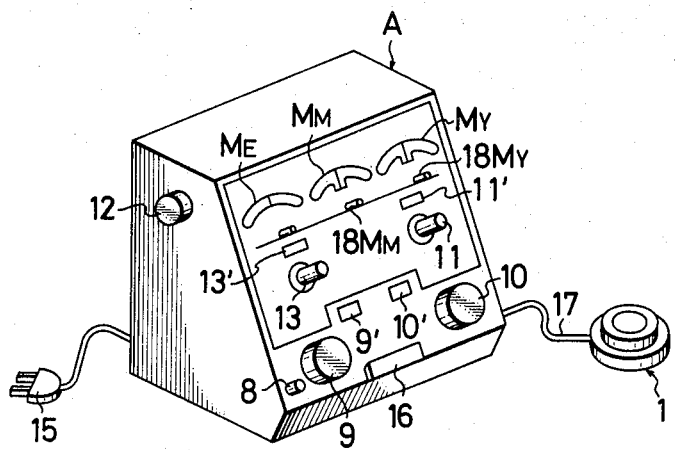
FIG. 4 is a perspective view showing the appearance of an apparatus embodying this invention.

FIG. 4 shows the appearance of an embodiment of translator. An operation panel A is provided with a power source switch 8 for turning on and off the power source, a dial 9 for operating the potentiometer RM of the reference voltage generating circuit 4M to set the magenta color correction filter number according to the negative color analyzer or like means, a dial 10 for operating the potentiometer RY of the reference voltage generating circuit 4Y for similarly setting the yellow color correction filter number, a knob 11 for operating the variable resistor RC of the parallel translation circuit 7 to set the cyan color correction filter number, a knob 12 for operating the potentiometer RE of the reference voltage generating circuit 4E for setting the amount of exposure, and a knob 13 for operating a changeover contact member 14 for the exposure multiplication number setting circuit 6 for selectively setting the multiplication of the exposure time.

The panel A is further formed with windows 9', 10', 11' and 13' for indicating the magenta color correction filter number, yellow color correction filter number, cyan color correction filter number and exposure time multiplication rate. The panel is further provided with an illuminated window 16 for reading data.

Indicated at 15 is an A.C. cord connector.

The light receiving unit 1 is connected by way of a lead wire 17 to the electric circuits incorporated in the foregoing assembly.

With respect to the light receiving unit 1, it is preferable to use silicon semiconductors for the photocells 1R, 1G and 1B in consideration of impact resistance, compactness, dependency of the spectral sensitivity on the wave length, fluctuations in spectral characteristics, cost, etc. To assure accurate values at a place subject to marked variations in temperature, the logarithmic converter circuits 2R, 2G and 2B comprise temperature compensation circuits and a D.C. stabilizing power source is provided for the circuits.

The dials 9 and 10 and knobs 11 and 12 are operated to set the respective color compensation amounts and exposure amount on the translator using the negative colar analyzer which gives the information concerning conditions of the negative only or by some means such as empirical means.

In this state, color correction filters according to the information are inserted into the enlarger, and the light receiving unit 1 is placed on the easel of the enlarger. The outputs from the photocells 1R, 1G and 1B in the unit 1 are converted to logarithmic form by the logarithmic converter circuits 2R, 2G and 2B, then processed by the arithmetic amplifier circuits 3Y, 3M and 3E as already described and applied to the comparison circuits 5Y, 5M and 5R as information involving printing conditions relating to the optical projecting system of the enlarger, fading of the color correction filters, transmission factors of the same, etc.

Since the comparison circuits 5Y, 5M and 5R are given reference voltages (or currents) for comparison with the foregoing inputs by being supplied with the information of the conditions of the negative, the results of comparison are indicated on the meters MY, MM and ME of the comparison circuits 5Y, 5M and 5E respectively.

If the readings on the meters MY and MM are zero and the meter ME indicates the exposure time initially determined by the analyzer or the like, this shows that the information values set by the analyzer or the like are suitable to make a color print of the desired image quality. Printing will then be conducted with the color compensation filters already set in the enlarger at the exposure amount already given.

If one or more of the meters do not indicate zero and the initially set exposure amount, the color compensation filter may be replaced so as to make the meters indicate zero and the initially set exposure amount. Alternatively, the outputs from the arithmetic amplifier circuits 3Y, 3M and 3F may be indicated directly on meters to match them with information values of the negative by performing the foregoing operation. Further if the outputs derived from a series of standard color correction filters used in combination with a standard light source are provided on the scale means of the reference voltage generating circuits 4Y and 4M, outputs derived from an enlarger and color correction filters of whatever type can be converted to the outputs from the standard color correction filters responsive to the light source. Thus color prints of the desired image quality can be made by a simple procedure in the same manner as above.

A color print will be prepared by the following procedure using an enlarger equipped with color correction filters of Kodak series, negative analyzer and transplator.

The enlarger is set for magnification, for example, at 5X and at a lens aperture number of 8 to print under the standard conditions of Y: 50, M: 50 and C: 0. Likewise, the translator is set for Y: 50, M: 50 and C: 0 and exposure time multiplication rate of x1.

The light receiving unit 1 is placed at the center of the easel of the enlarger, with the negative carrier displaced. The light receiving unit 1 is then subjected to white light from the light source without placing a negative in set position. Subsequently, the variable resistors RMM and RMY included in the reference voltage generating circuits 4Y and 4M are operated by adjusting knobs 18MM and 18MY to provide zero readings on the meters MM and MY, whereby the translator will be completely adjusted for use with the foregoing color correction filters. This operation can be conducted very easily and promptly while viewing the readings on the meters MM and MY.

After the translator has been adjusted, memory setting will be made for the negative color analyzer. For this, a test print is made from a standard negative to determine the optimum printing conditions, and the negative is then displaced from the printing position to conduct measurement under the same conditions. The memory module is so set that the filter numbers for Y and M on the memory side indicated on windows 9' and 10' of the translator, when the meters MM and MY on the translator give the readings of zero, will be shown at the indication section in respect of the Y and M on the analyzer. Preparatory operation is thus completed.

To make an enlargement, a netative to be printed is set on the enlarger and focused at the desired magnification. The indicated value on the analyzer for the negative is read out on a data paper, and the translator is set at the value.

The light receiving unit 1 is then placed on the easel to measure the light with the negative displaced from the set position. The color correction filters are adjusted to permit the meters MM and MY to indicate zero. The diaphragm aperture is adjusted so that the exposure time indicating meter ME will indicate the value shown on the analyzer. The negative is then set in position, making it sure that it is focused. The lamp in the enlarger is turned off and an exposure is subsequently made by a timer with printing paper placed in position.

Although the exposure time setting is made first on the analyzer and then transferred onto the translator according to this invention as described above, the translator may alternatively include an exposure meter to determine the exposure amount directly on the easel, whereby the exposure time can also be readily set.

What is claimed is:

1. A translator for measuring the amount of color correction for color printing comprising:
   a light receiving unit including three kinds of photocells having spectral sensitivities corresponding to red, green and blue colors respectively for measuring light from the optical projecting system of an enlarger equipped with color correction filters,
   arithmetic means for calculating ratios between the outputs of the light receiving unit responsive to the respective colors by taking one of the outputs as denominators and the other two outputs as numerators respectively, an amplifier for amplifying the output takenas the denominator,
   reference voltage generating means for setting three comparison outputs for the three outputs of the arithmetic means respectively, the reference voltage generating means memorizing the comparison outputs previously set, and
   comparison means for comparing the outputs of the arithmetic means with the outputs of the comparison output setting means in corresponding relation thereto, the comparison means having indicators for indicating the differences between the outputs of the arithmetic means and the corresponding set comparison outputs respectively.

2. The translator as set forth in claim 1 further comprising logarithmic converter means for converting the three outputs of the light receiving unit to logarithmic form respectively to apply the resulting logarithmic outputs thereof to the arithmetic means.

3. The translator as set forth in claim 1 further comprising means for setting an exposure multiplication number for an enlarging degree set on the enlarger, the exposure multiplication number setting means having changeover means for controlling one of the outputs of the light receiving unit that is fed to the amplifier of the arithmetic means and the corresponding comparison output set by the comparison output setting means.

4. The translator as set forth in claim 1 wherein the reference voltage generating means incudes parallel translationmeans for controlling the comparison reference outputs to prevent any one of the set comparison outputs from becoming impossible to indicate.

5. A translator for measuring the amount of color correction for color printing comprising:
   a light receiving unit including three kinds of photocells having spectral sensitivities corresponding to red, green and blue colors respectively for receiving light from the optical projecting system of an enlarger equipped with color correction filters, the photocells being operative to produce outputs corresponding to the intensities of light of colors responsive thereto,
   arithmetic amplifier circuits for calculating ratios between the outputs of the light receiving unit responsive to the respective colors by taking one of the outputs as denominators and the other two outputs as numerators respectively, the circuits being operative to produce calculated values of the ratios as outputs respectively individually,
   comparison output setting circuits for setting two comparison outputs for the outputs of the arithmetic amplifier circuits respectively, the comparison output setting circuits having potentiometers for permitting the comparison outputs to be determined only by the conditions of a negative previously memorized,
   comparison circuits for comparing the outputs of the arithmetic circuits with the outputs of the comparison output setting circuits individually in corresponding relation thereto, the comparison circuits having indicators for indicating the differences between the outputs of the arithmetic circuits and the corresponding set comparison outputs respectively,
   an amplifier circuit for amplifying the output of the light receiving unit taken as the denominators for the aforesaid calculation,
   another comparison output setting circuit for producing a comparison output corresponding to the output of the amplifier circuit, including a potentiometer for setting the comparison output, and
   another comparison circuit for comparing the output of the amplifier circuit with the output of the second-mentioned comparison output setting circuit to indicate the difference therebetween.

6. The translator as set forth in claim 5 further comprising logarithmic converter circuits for converting the outputs of the light receiving unit to logarithmic form respectively to apply the resulting logarithmic outputs thereof to the arithmetic amplifier circuit and the amplifier circuit.

7. The translator as set forth in claim 5 further comprising means for setting an exposure multiplication number for an enlarging degree set on the enlarger, the exposure multiplication number setting circuit having changeover contacts for controlling the outputs of the amplifier circuit and the set comparison outputs of the other comparison output setting circuit and a plurality of resistance circuits of different resistance values changed at each contact.

8. The translator as set forth in claim 5 wherein the comparison output setting circuit and the comparison output setting circuit include parallel translation means for controlling the comparison reference voltages, the parallel translation means preventing any one of the set comparison outputs from becoming impossible to indicate by having its resistance values controlled.

9. The translator as set forth in claim 5 wherein the outputs of the red light receiving unit are taken as the denominators.

* * * * *